Aug. 14, 1956  C. M. RICE  2,758,628
BOLT AND NUT ROTATION RESTRAINING MEANS
Filed Dec. 21, 1953  2 Sheets-Sheet 1
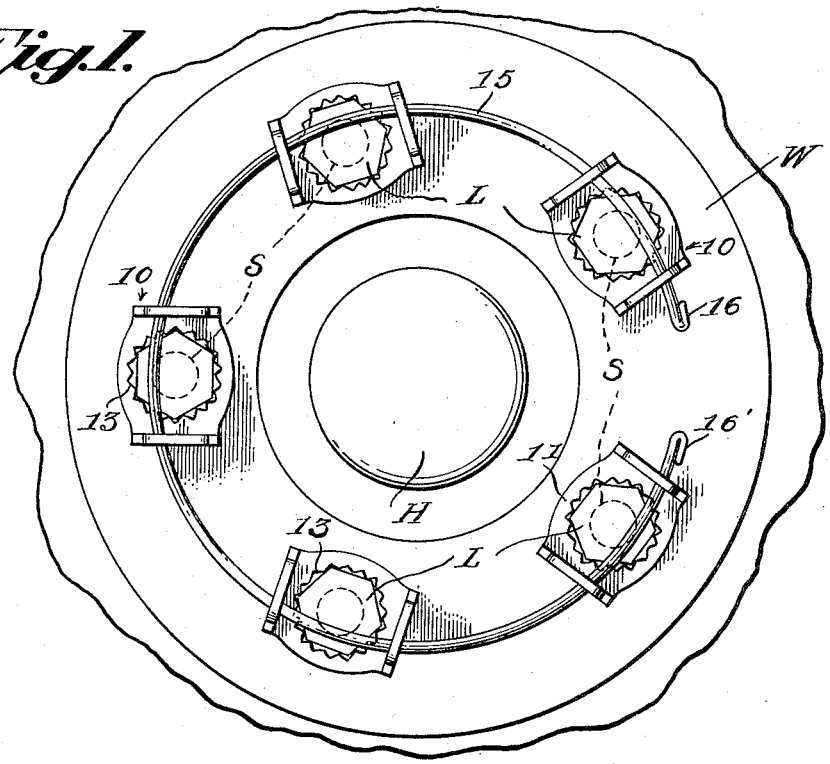
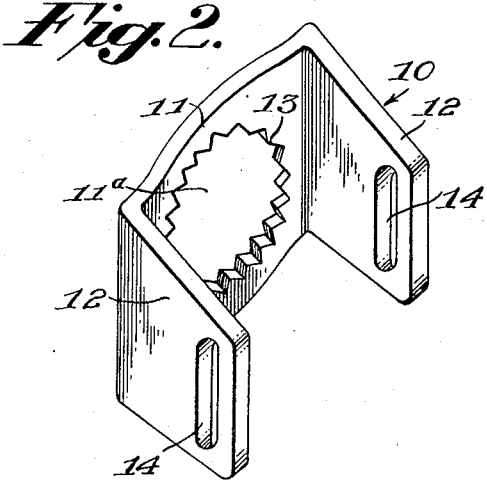
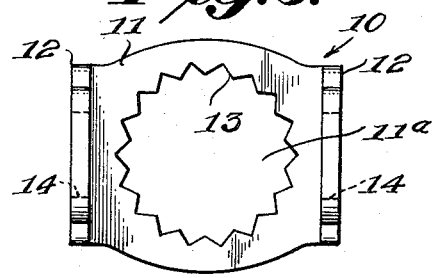
INVENTOR
Clifford M. Rice.
BY George C. Cook.
ATTORNEY Aug. 14, 1956  C. M. RICE  2,758,628
BOLT AND NUT ROTATION RESTRAINING MEANS
Filed Dec. 21, 1953  2 Sheets-Sheet 2
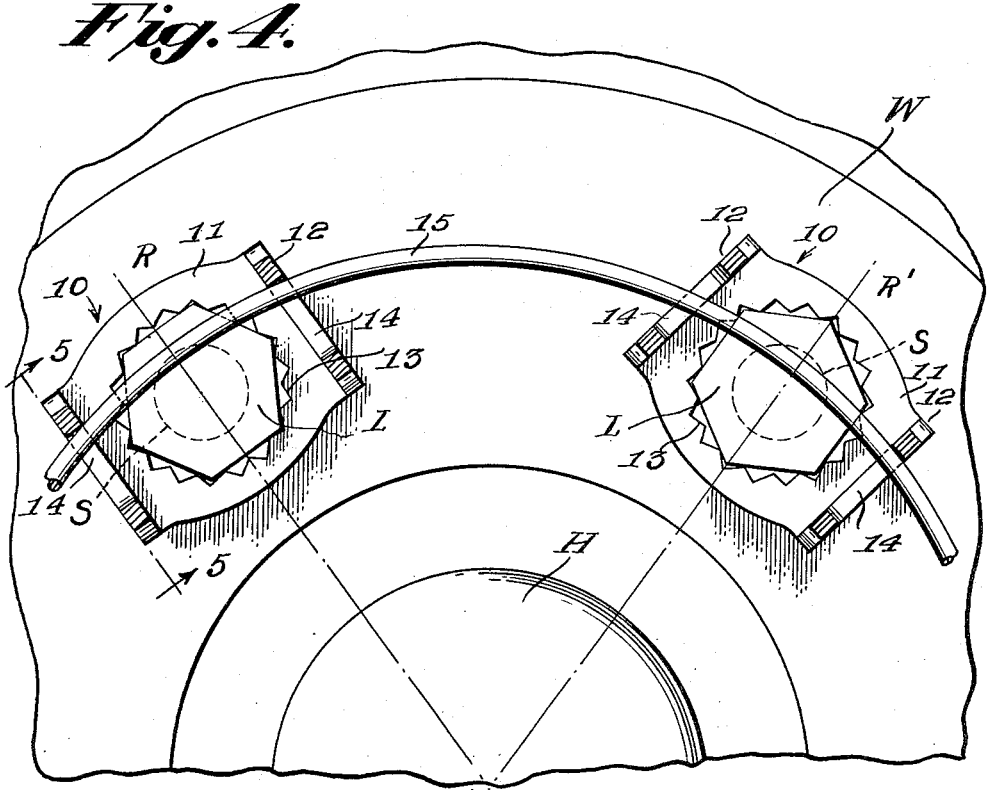
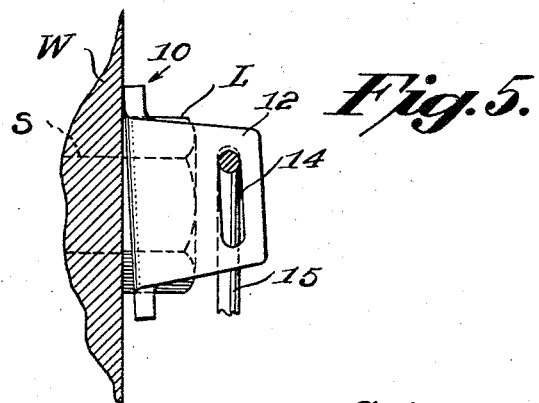
INVENTOR
Clifford M. Rice.
BY George E. Cook.
ATTORNEY

United States Patent Office 2,758,628
Patented Aug. 14, 1956

2,758,628

BOLT AND NUT ROTATION RESTRAINING MEANS

Clifford M. Rice, Alexandria, Va.

Application December 21, 1953, Serial No. 399,462

3 Claims. (Cl. 151—54)

This invention relates to bolt and nut rotation restraining means.

The invention is more particularly concerned with means which is readily applicable to the polygonal heads of studs which are utilized to removably secure wheels to the hubs of automobiles and which means functions to prevent inadvertent outward turning of such studs with a resulting removal of the wheels.

The present invention is for the same purpose as, but is an improvement over the structure disclosed in my co-pending application Serial No. 353,335, filed May 6, 1953, and now abandoned.

While it may not be generally known that automobile wheels become detached from the hubs to which they are removably secured by a plurality of studs as a result of the gradual unthreading of the studs occasioned by constant vibration of the automobile, such is nevertheless a fact and has resulted in serious injury including both property and personal.

It would be naturally assumed that the wheel attaching lugs would retain their wheel securing positions due to the high frictional grip as occasioned by the tightness thereof when drawn into wheel locking position.

This, however, is not the case, since the inventor himself unpleasantly witnessed the loss of a wheel from his car while in motion as a result of the retaining lugs working loose.

Such experiences are not only nerve racking but often entail considerable car damage as well as personal injury.

A primary object of the present invention in common with that of the invention disclosed in said co-pending application is to provide simple means readily applicable to automobile wheel retaining studs for effectively preventing reverse rotation thereof and thereby avoiding the serious circumstance of losing a wheel.

A further object of the invention is to provide a device of the kind referred to which is capable of manufacture at less expense than the device disclosed in said co-pending application.

Other objects and advantages of the invention will become apparent in the course of the following detailed description, taken in connection with the accompanying drawings, wherein—

Fig. 1 is a fragmental elevational view showing the hub portion of the wheel and the wheel hub prior to placement of the usual hub cap and showing the application of the invention in a preferred structural embodiment thereof.

Fig. 2 is an isometric view of one of several clips involved in the invention.

Fig. 3 is a front elevational view of the clip in accordance with a preferred structural embodiment thereof.

Fig. 4 is a substantially enlarged fragmental elevational view wherein only two of the lugs are shown, the view particularly emphasizing the application of the clips.

Fig. 5 is a radial sectional view as observed in the plane of line 5—5 on Fig. 4.

Referring now in detail to the drawings, W designates a removable wheel whose hub portion surrounds the wheel hub H as in well known practice.

As is common, the wheel W is removably retained on the wheel hub H by means of a plurality of lugs L having threaded studs S extendable through apertures in the wheel and threadable into tapped apertures in the hub.

While such lugs are usually drawn up tight upon mounting the wheel on the hub, it has nevertheless been found that same tend to work loose and in fact all such lugs, or at least a sufficient number thereof, have become wholly detached with the result that the wheel came off.

This condition has in fact heretofore been recognized by automobile manufacturers who for a possible remedy resorted to the use of left hand threaded lugs on the left side wheels and right hand threaded lugs on the right side wheels.

The present invention comprises a plurality of clip members 10, one for each lug L. Each said clip member 10 is stamped from sheet steel thereby rendering same facile of manufacture at relatively low cost.

Each clip member 10 includes a wheel face engaging plane base 11 from which project flanges 12 in laterally spaced relation and at right angles thereto.

The base 11 is provided with a lug receiving aperture 11$^a$ whose peripheral wall is serrated as at 13 thereby providing a series of circumferentially spaced inwardly facing V-notches for gripping corners of the polygonal lugs L.

The flanges 12 are each provided with a slot 14 which is elongated in a direction parallel with the juncture of the flanges with the base.

An arcuate spring steel rod 15 is freely threaded through the several slots 14 and the opposite ends of the rod are bent over as at 16 or otherwise enlarged whereby the several clip members 10 will remain with the rod as a unit for installation on a wheel.

In the application of the device with the several clip members supported on the spring steel rod, which normally assumes a greater diameter than in its applied position, an endmost clip member is first moved inwardly axially of a lug L with such lug received within the aperture 11$^a$.

The second clip member is then engaged and moved radially inwardly against the yieldable reaction of the rod and moved over the second lug L.

This process is repeated until all of the clip members have been positioned on the corresponding lugs L and in which assembled position, the rod 15 will react radially outwardly and firmly bind the walls of certain V-notches of the serrations 13 with the corners of the lugs which will not only prevent rotation of the lugs but will also provide such frictional contact between the clip members and lugs as to prevent lateral outward movement of the former on the latter.

In Fig. 1 the lugs L are all shown in the same position relative to the respective radii of the wheel with a corresponding uniform disposition of the clip members 10.

It is obvious however, that such an arrangement will seldom prevail and one lug L may be in the position as shown in Fig. 1 and as shown on the radius R in Fig. 4 and a second lug L may be in the position of radius R$^1$ in Fig. 4.

Different angular positions of the polybonal lugs L will necessitate different angular positions of the clip members relative to radii of the respective lugs L as is indicated in Fig. 4 and wherein is illustrated the necessity of the elongated slots 14.

As is indicated in this figure, the rod 15 engages the outer ends of both slots 14 in the left clip member 10, while the rod engages the outer end of only one of the slots 14 in the right clip member 10, the other slot being traversed by the rod intermediate its ends. In the instances where the rod does not engage corresponding ends of both slots the clip member will be permitted substantially little rotation.

As is indicated in Fig. 5 the outward reacting tension in rod 15 will tend to twist the clip members 10 with a correspondingly greater grip between same and the lugs L and centrifugal action upon rotation of the wheel will augment the above described action.

While the clip members 10 are shown as having inwardly facing V-notches of a specific angle, same may be greater or less within the scope of the invention and it is not necessary that every corner of the polygonal lug be received within a notch since comparatively little effort is required to prevent retrograde movement of the lugs.

While I have disclosed my invention in accordance with a single specific structural embodiment thereof, such is to be considered as illustrative only, and not restrictive, the scope of the invention being defined in the sub-joined claims.

What I claim and desire to secure by U. S. Letters Patent is:

1. Means for restraining retrograde rotation of a circular series of polygonal wheel retaining lugs, comprising a plurality of clip members equal in number to that of the lugs, each clip member including a flat base and a pair of spaced parallel flanges projecting outwardly from the same side of the base in substantial right angular relation thereto, the said base being provided with a lug receiving aperture intermediate the flanges, the wall surrounding said aperture having notches for receiving angular portions of the respective lug, said flanges each being provided with an elongated slot in parallel relation to the junction line between the flange and base and an arcuate spring steel rod extending through the slots of all of the clip members for yieldable reaction against the radial outer end of at least one of the slots of each clip member when same are operatively engaged with the lugs with a resulting frictional grip between the clip members and the lugs.

2. The structure according to claim 1, wherein said slots are of a width sufficient only to permit free movement of the rod therein, and said rod having opposed enlarged free ends whereby the clip members are retained on the rod at all times.

3. The structure according to claim 1, wherein said slots are disposed at a substantial distance in front of said base, and the radial outer ends of said slots in the applied position of the clip members are radially inward of the radially outermost portion of said base, whereby said portion provides a fulcrum for tipping action of said clip members under the action of said rod with a resulting firm grip between the clip members and the lugs.

References Cited in the file of this patent

UNITED STATES PATENTS 2,431,735    Cyr                    Dec. 2, 1947

FOREIGN PATENTS 672,705    Germany              Mar. 8, 1939